(12) United States Patent
Wakita (10) Patent No.: US 11,888,360 B2
(45) Date of Patent: Jan. 30, 2024

(54) BRUSH MOTOR

(71) Applicant: MABUCHI MOTOR CO., LTD., Chiba (JP)

(72) Inventor: Tadayuki Wakita, Chiba (JP)

(73) Assignee: MABUCHI MOTOR CO., LTD., Chiba (JP)

( * ) Notice: Subject to any disclaimer, the term of this patent is extended or adjusted under 35 U.S.C. 154(b) by 0 days.

(21) Appl. No.: 17/730,193

(22) Filed: Apr. 27, 2022

(65) Prior Publication Data

US 2022/0352791 A1 Nov. 3, 2022

(30) Foreign Application Priority Data

Apr. 30, 2021 (JP) ................. 2021-077067

(51) Int. Cl.
| | |
|---|---|
| *H02K 13/10* | (2006.01) |
| *H02K 23/26* | (2006.01) |
| *H02K 3/48* | (2006.01) |
| *H02K 3/18* | (2006.01) |
| *H02K 3/38* | (2006.01) |

(52) U.S. Cl.
CPC ............ *H02K 13/10* (2013.01); *H02K 3/18* (2013.01); *H02K 3/38* (2013.01); *H02K 3/48* (2013.01); *H02K 23/26* (2013.01)

(58) Field of Classification Search
CPC .... H02K 13/04; H02K 13/10; H02K 2213/03; H02K 23/26; H02K 23/405; H02K 3/18; H02K 3/38; H02K 3/48; H02K 27/00; H02K 27/12; H02K 27/14; H02K 27/16; H02K 27/18; H02K 27/02; H02K 27/22
See application file for complete search history.

(56) References Cited

U.S. PATENT DOCUMENTS

| | | | | |
|---|---|---|---|---|
| 6,153,960 A | * | 11/2000 | Katagiri ............... | H02K 13/105 310/233 |
| 6,285,109 B1 | * | 9/2001 | Katagiri ............... | H02K 13/105 310/40 MM |
| 6,362,555 B1 | * | 3/2002 | Katagiri ................ | H02K 23/30 310/40 MM |

(Continued)

FOREIGN PATENT DOCUMENTS

| | | | | |
|---|---|---|---|---|
| CN | 106655562 B | * | 9/2018 | |
| DE | 102014222064 A1 | * | 5/2016 | ............. H02K 1/146 |

(Continued)

OTHER PUBLICATIONS

DE-102014222064-A1, Evans, all pages (Year: 2016).*

(Continued)

*Primary Examiner* — Naishadh N Desai
(74) *Attorney, Agent, or Firm* — HAUPTMAN HAM, LLP (57) ABSTRACT

A brush motor includes: a rotor core provided in a rotor; s teeth provided in the rotor core; s concentrated-winding coils with electric wires being respectively wound around the teeth; a commutator provided on the rotor in a relatively non-rotatable manner; c commutator pieces provided in the commutator and connected to the coils; p pairs of magnet magnetic poles provided on a stator and arranged to face the teeth; and a brush that is brought into sliding contact with the commutator pieces to supply a current to the coils, in which $0.5 < p/s < 1$ and $s < c$.

6 Claims, 8 Drawing Sheets

(56) References Cited

U.S. PATENT DOCUMENTS

2003/0201690 A1* 10/2003 Mori ..................... H02K 23/30
310/264

FOREIGN PATENT DOCUMENTS

| | | | |
|---|---|---|---|
| DE | 102017003992 A1 | * | 10/2018 |
| DE | 102019004428 A1 | * | 12/2020 |
| JP | S59185140 A | | 10/1984 |
| JP | S63005427 Y2 | | 2/1988 |
| JP | H1169747 A | | 3/1999 |
| WO | WO-03077405 A1 | * | 9/2003 ............. H02K 1/276 |

OTHER PUBLICATIONS

DE-102017003992-A1, Froelich, all pages (Year: 2018).*
DE-102019004428-A1, Rottmerhusen, all pages (Year: 2020).*
WO-03077405-A1, Kawai, all pages (Year: 2003).*
CN-106655562-B, Han, all pages (Year: 2018).*

* cited by examiner

BRUSH MOTOR

RELATED APPLICATIONS

The present application claims priority to Japanese Application No. 2021-077067 filed Apr. 30, 2021, the disclosure of which is hereby incorporated by reference herein in its entirety.

BACKGROUND

Technical Field

The present disclosure relates to a brush motor in which a coil is energized from a brush through a commutator.

Related Art

Conventionally, a brushed DC motor in which the number of coils is larger than the number of field magnetic poles has been known. An example of such a motor is a four-pole/six-slot motor having a concentrated-winding structure (structure in which an electric wire of coils is individually wound around teeth, respectively) having four field magnetic poles and six iron core grooves (slots). In this motor, coils as many as the number of iron core grooves are provided, and six coils more than four, which is the number of field magnetic poles, are incorporated (see JPH11-69747).

SUMMARY

In the motor including the coils having the concentrated-winding structure, in a case where the number of coils is larger than the number of field magnetic poles, a blade angle in a cross section perpendicular to a rotation axis of the motor becomes smaller than a magnet angle. As a result, a magnet magnetic flux is insufficiently picked up, and there is a problem that it is difficult to effectively utilize the magnetic flux. In addition, in a case where a coil having a straddling winding structure in which an electric wire is wound so as to straddle a plurality of teeth is adopted, there is a problem that it is difficult to increase torque because a coil end bulges so that winding resistance increases.

One object of the present disclosure is to provide a brush motor that has been created in light of the above problems and is capable of achieving downsizing and high torque with a simple configuration. Note that the present disclosure is not limited to this object, and it is also possible to position, as another object of the present disclosure, achieving functions and effects that are derived from each configuration illustrated in "DETAILED DESCRIPTION" to be described later, the functions and effects being hardly obtained by conventional techniques.

A brush motor according to an embodiment of the present disclosure includes: a rotor core provided in a rotor; s teeth provided in the rotor core; s concentrated-winding coils with electric wires being respectively wound around the teeth; a commutator provided on the rotor in a relatively non-rotatable manner; c commutator pieces provided in the commutator and connected to the coils; p pairs of magnet magnetic poles provided on a stator and arranged to face the teeth; and a brush that is brought into sliding contact with the commutator pieces to supply a current to the coils, in which the following inequality A and inequality B hold.

$$0.5 < p/s < 1 \quad \text{(Inequality A)}$$

$$s < c \quad \text{(Inequality B)}$$

According to the disclosed technology, the magnet magnetic flux can be sufficiently picked up, and the downsizing and the high torque can be achieved with a simple configuration.

DETAILED DESCRIPTION

1. First Example

[A. Configuration]

Figure 1:
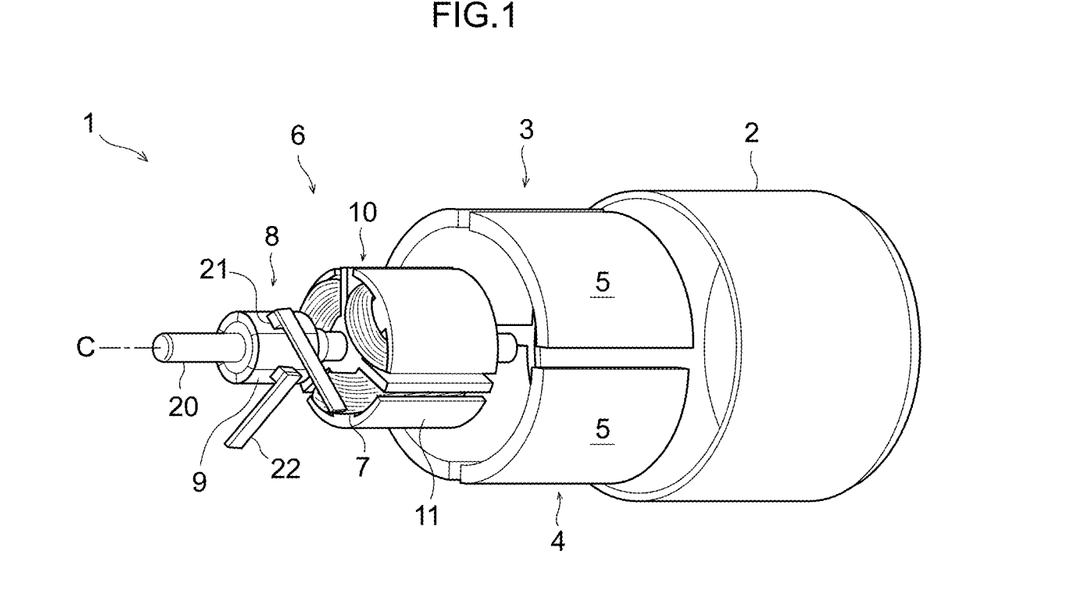
FIG. 1 is an exploded perspective view of a brush motor as a first example.

FIG. 1 is an exploded perspective view illustrating main components of a brush motor 1 (brushed motor) as a first example. The brush motor 1 includes a stator 3 (stator), a rotor 6 (rotor), and a shaft 20. The stator 3 and the rotor 6 are accommodated in a housing 2 formed in a bottomed cylindrical shape as illustrated in FIG. 1. In FIG. 1, the description of a lid member (end bell) that closes an open end (left end in FIG. 1) of the housing 2 is omitted. The shaft 20 is a shaft-shaped member supported by the housing 2 and the end bell via a bearing (not illustrated). The stator 3 is fixed to the housing 2, and the rotor 6 is fixed to the shaft 20 and rotates integrally with the shaft 20. A central axis of the shaft 20 coincides with a rotation axis C of the rotor 6.

The stator 3 is provided with a magnet 4 (permanent magnet) for forming a magnetic field to be applied to the rotor 6. The magnet 4 has p pairs of magnet magnetic poles 5 formed in a curved surface shape. A shape of the magnet magnetic pole 5 is, for example, an arc surface shape or a shape similar thereto. The magnet magnetic poles 5 are attached along an inner peripheral surface of the housing 2 and arranged at predetermined intervals in the circumferential direction (circumferential direction of a circle centered on the rotation axis C in a cross section perpendicular to the rotation axis C). An orientation of a magnetic field is set to a direction from the outside to the inside of the housing 2 or the opposite direction (direction from the inside to the outside). In the present disclosure, the magnet magnetic poles 5 are arranged such that orientations of the magnetic fields are reversed between the adjacent magnet magnetic poles 5.

The magnet 4 illustrated in FIG. 1 is formed by combining four magnet pieces in which one magnetic pole pair is magnetized in one piece, but may be formed by combining magnet pieces in which a plurality of magnetic pole pairs is magnetized in one piece. Alternatively, a tubular magnet (ring magnet) that is not divided into a plurality of magnet pieces may be used as the magnet 4. In the ring magnet, the plurality of magnet magnetic poles 5 (magnetized regions) is adjacently arranged in the circumferential direction, but a non-magnetized region may be provided between the magnet magnetic poles 5. The non-magnetized region is a region that does not substantially contribute to formation of the magnetic field with respect to the rotor 6, and is a portion corresponding to a gap between the magnet magnetic poles 5 illustrated in FIG. 1. In this manner, it is unnecessary for a physical division number of the magnet 4 to match a magnetic division number.

The rotor 6 is provided with a core 10 (rotor core) and a commutator 8 (commutator) that are fixed to the shaft 20 in a relatively non-rotatable manner. The core 10 is formed by laminating a plurality of steel plates having the identical shape. A lamination direction of the steel plates is identical to an extending direction of the rotation axis C. The core 10 is provided with s teeth 11 having a shape radially protruding from the rotation axis C in the cross section perpendicular to the rotation axis C. Electric wires are wound respectively around the teeth 11 to form s coils 7 (concentrated-winding coils).

The commutator 8 is a member for energizing the coil 7 at an appropriate position according to a rotation angle of the rotor 6 in an appropriate orientation. The commutator 8 is provided with c commutator pieces 9 formed in a curved surface shape. A shape of the commutator piece 9 is formed in, for example, an arc surface shape or a shape similar thereto. These commutator pieces 9 are adjacently arranged in the circumferential direction along an outer peripheral surface of the shaft 20. Each of the commutator pieces 9 and each of the coils 7 are connected by a power supply circuit 23. A circuit structure of the power supply circuit 23 will be described later.

A brush 21 (brush) is provided in the periphery of the commutator 8 so as to be in contact with the surface of the commutator piece 9. The brush 21 is attached to one end of a brush arm 22 and is supported in a state of being elastically pressed against the commutator piece 9. In addition, a pair of the brushes 21 and a pair of the brush arms 22 are provided. The other ends of the brush arms 22 pass through, for example, the lid member, extend to the outside of the housing 2 and serve as terminals for power supply.

The brushes 21 are provided so as to be in contact with any one of the c commutator pieces 9.

Regarding the relationship among the p pairs of magnet magnetic poles 5, the s coils 7, and the c commutator pieces 9, values of p, s, and c are set such that the following inequalities hold in the present disclosure. That is, a value obtained by dividing the number p of sets (the number of pairs including two as one set) of the magnet magnetic poles 5 by the number s of the coils 7 is set to be larger than 0.5 and smaller than 1. In addition, the number s of the coils 7 is set to be smaller than the number c of the commutator pieces 9.

$$0.5 < p/s < 1 \quad \text{(Inequality A)}$$

$$s < c \quad \text{(Inequality B)}$$

Note that, "p<s<2p" is obtained if Inequality A is transformed. Therefore, it suffices that the number s of the coils 7 is set to be larger than the number p of sets of the magnet magnetic poles 5 and smaller than the total number 2p of the magnet magnetic poles 5.

Figure 2:
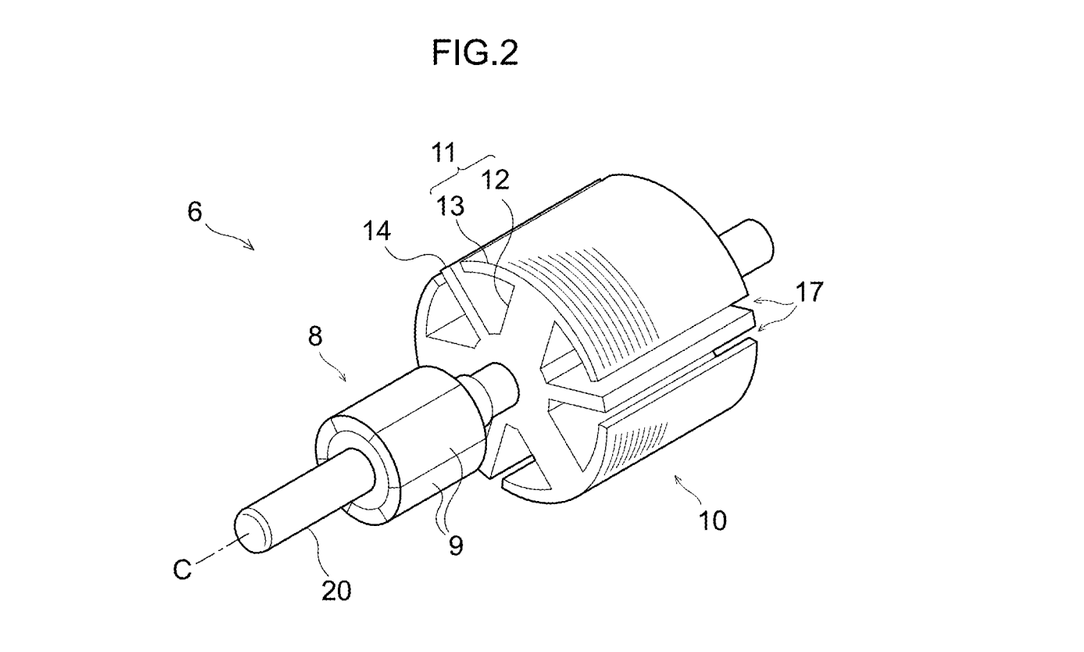
FIG. 2 is a perspective view of a rotor incorporated in the brush motor of FIG. 1.

FIG. 2 is a perspective view illustrating the rotor 6 including the core 10 from which the electric wire of the coil 7 is removed. Each of the teeth 11 has a column 12 and a blade 13. The column 12 is a portion extending radially outward of the rotor 6. In addition, the blade 13 is a portion having a curved surface shape (an arc surface shape or a shape similar thereto), expanded in the circumferential direction of the rotor 6 from an outer end of the column 12, and is arranged so as to face the magnet magnetic pole 5 in a non-contact manner. The electric wire of the coil 7 is wound around the column 12 in multiple times by a concentrated-winding method.

Figure 3:
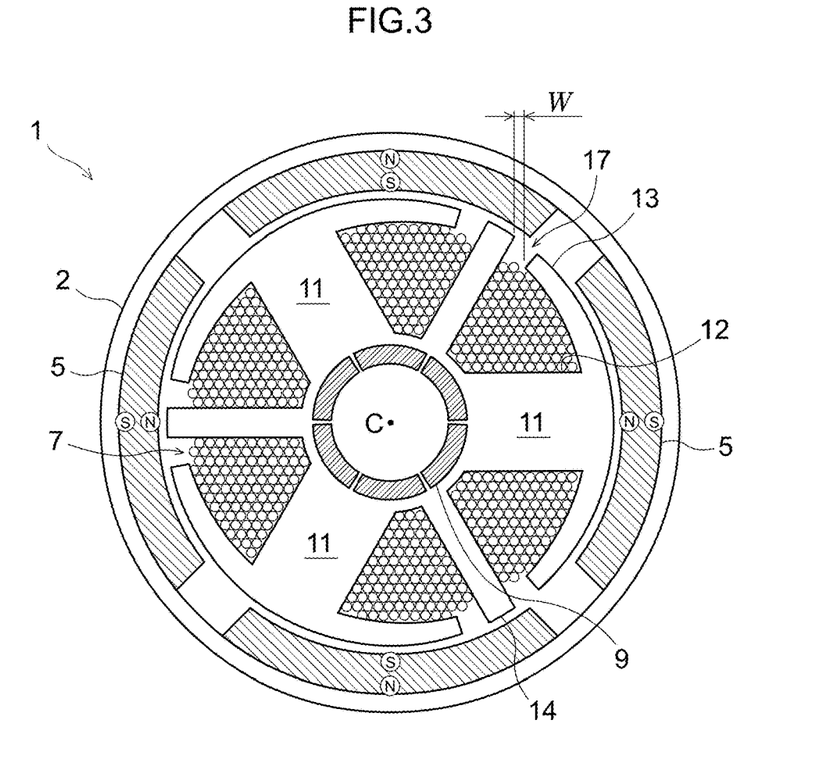
FIG. 3 is a cross-sectional view of the brush motor of FIG. 1.

FIG. 3 is a cross-sectional view of the stator 3 and the rotor 6. Here, a cross-sectional view of the commutator piece 9 is also displayed in a superimposed manner for the sake of convenience. The brush motor 1 includes two pairs of magnet magnetic poles 5, three coils 7, and six commutator pieces 9. A combination of (p, s, c) is (2, 3, 6), which is a four-pole/three-slot motor.

The core 10 of the brush motor 1 according to the first example includes a commutating pole 14. The commutating pole 14 is a portion radially extending from the rotation axis C of the rotor 6 to reinforce a flow of a magnetic flux, and is provided integrally with the core 10. As illustrated in FIG. 3, the commutating pole 14 is arranged between the adjacent teeth 11 in the cross section perpendicular to the rotation axis C so as to partition between the coils 7. The commutating pole 14 does not have the coil 7, and the electric wire of the coil 7 is not wound around the commutating pole 14. Note that a commutating pole blade 16 may be formed at a distal end of the commutating pole 14 as illustrated in a second example to be described later. In addition, a slit 17 having a predetermined width is provided between the blade 13 of the tooth 11 and the commutating pole 14. As a result, a slit width W in a winding direction of the coil 7 (an extending direction of the column 12 and a radial direction of the rotor 6) is secured.

Figure 4:
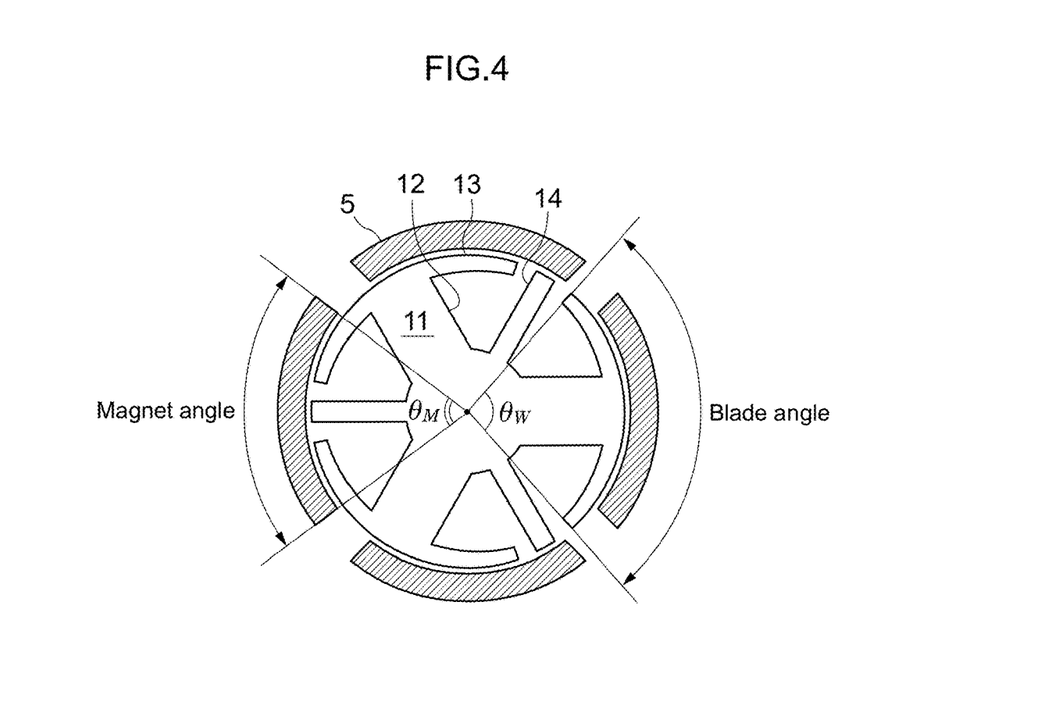
FIG. 4 is a view illustrating a magnet angle and a blade angle of the brush motor of FIG. 1.

FIG. 4 is a view illustrating a magnet angle $\theta_M$ and a blade angle $\theta_W$ of the brush motor 1. In the cross section perpendicular to the rotation axis C, a range where the magnetized region of one magnet magnetic pole 5 substantially covers the rotor 6 is expressed by an angle with respect to the rotation axis C, and this is referred to as the magnet angle $\theta_M$. For example, in a case where the magnet 4 is divided into a plurality of magnet magnetic poles 5 (a plurality of magnet pieces) as illustrated in FIG. 4, a central angle of a fan shape surrounded by the magnet magnetic pole 5 and line segments connecting both ends of the magnet magnetic pole 5 to the rotation axis C in the cross section perpendicular to the rotation axis C is defined as the magnet angle $\theta_M$. In addition, in a case where the magnet 4 is a ring magnet, a range in which a magnetic force appears in the radial direction without including a non-magnetized region is expressed by an angle with respect to the rotation axis C, and this range is defined as the magnet angle $\theta_M$.

Figure 14:
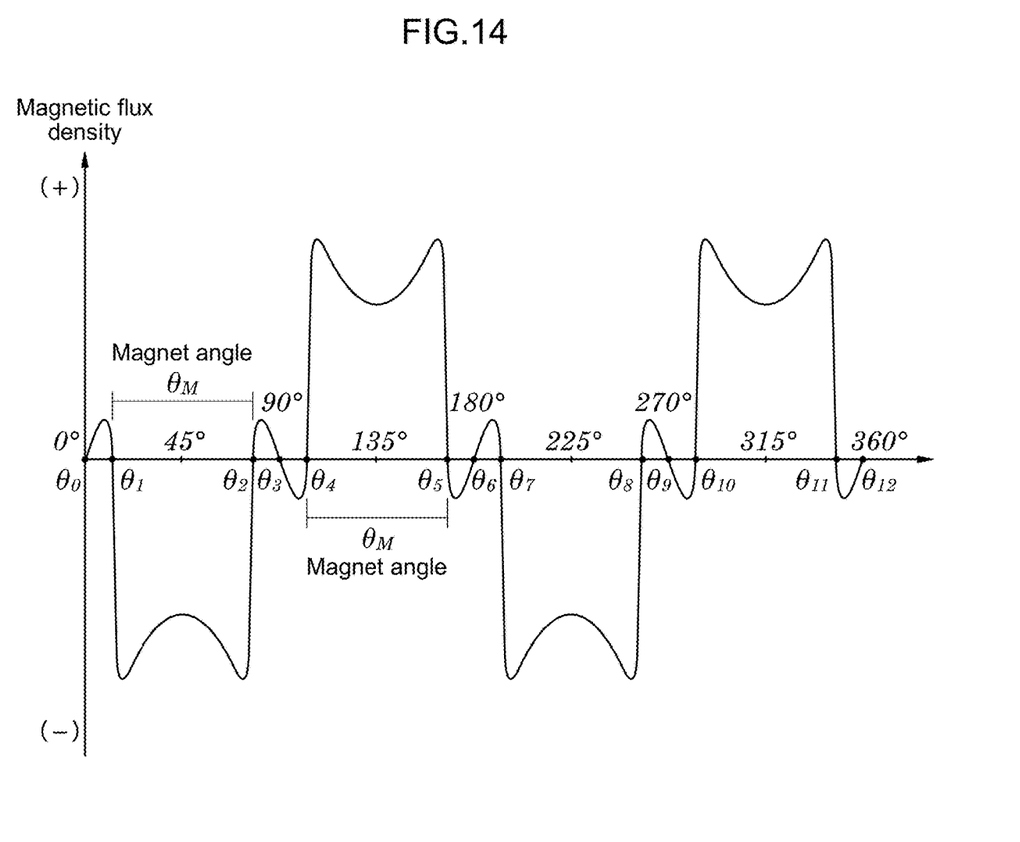
FIG. 14 is a graph for describing a magnet angle of a ring magnet.

Note that both ends of the magnetized region when a plurality of magnetic poles is magnetized in the ring magnet or the single magnet piece have an angle at which the magnetic flux density decreases from a center position (magnetization center position) of each magnetic pole, and the magnetic flux density first becomes zero. The relationship between a magnetic flux density distribution of the ring magnet and the magnet angle $\theta_M$ is illustrated in FIG. 14. Angles $\theta_0$ to $\theta_{12}$ in FIG. 14 represent angles at which the magnetic flux density becomes zero. As illustrated in FIG. 14, a non-magnetized region or a minute polarity inversion region may be generated in the vicinity of 0° ($\theta_0$ to $\theta_1$), 90° ($\theta_2$ to $\theta_4$), 180° ($\theta_5$ to $\theta_7$), and 270° ($\theta_8$ to $\theta_{10}$), which correspond to a switching point with an adjacent magnetic pole, and the magnet angle $\theta_M$ is defined excluding such ranges. In FIG. 14, as indicated by $\theta_1$ to $\theta_2$, $\theta_4$ to $\theta_5$, $\theta_7$ to $\theta_8$, and $\theta_{10}$ to $\theta_{11}$, an angular range from when an absolute value of the magnetic flux density exceeds zero to when the magnetic flux density includes the center position of each magnetic pole and reaches 0 again is defined as the magnet angle $\theta_M$. In any case, the angle formed by the magnetized region of one magnet magnetic pole 5 and the rotation axis C in the cross section perpendicular to the rotation axis C is defined as the magnet angle θM.

In addition, a range in which one blade 13 faces the magnet 4 in the cross section perpendicular to the rotation axis C is expressed by an angle with respect to the rotation axis C, and this is referred to as a blade angle $\theta_W$. That is, a central angle of a fan shape surrounded by the blade 13 and line segments connecting both ends of the blade 13 to the rotation axis C in the cross section perpendicular to rotation axis C is defined as the blade angle $\theta_W$. In the brush motor 1 of the first example, the blade angle $\theta_W$ is preferably set to the magnitude of the magnet angle $\theta_M$ or more ($\theta_W \geq \theta_M$). As a result, the magnet magnetic flux is easily picked up by the teeth 11, and the magnetic flux is effectively utilized.

Figure 5:
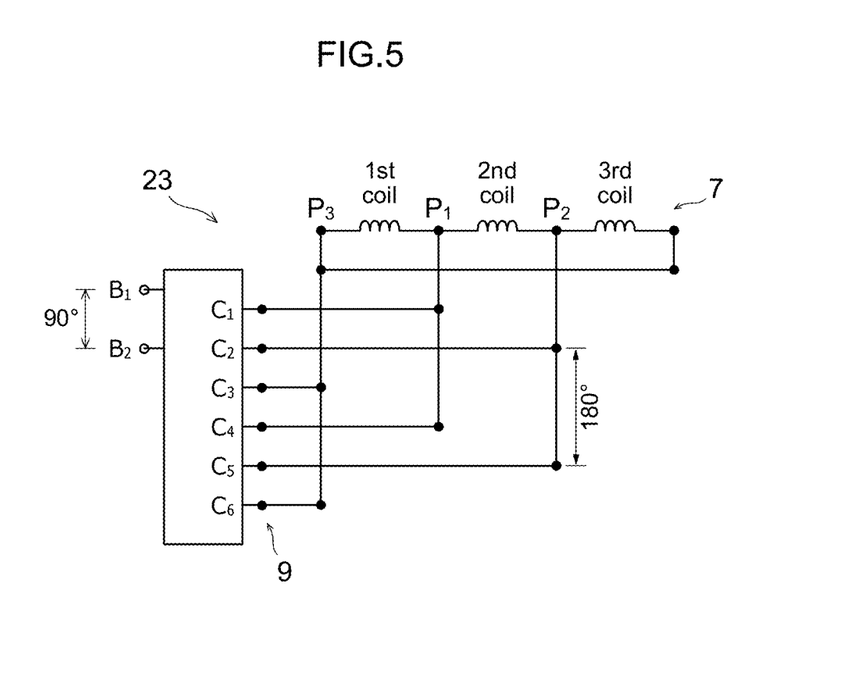
FIG. 5 is a circuit diagram illustrating a structure of a power supply circuit in the brush motor of FIG. 1.

FIG. 5 is a circuit diagram illustrating a structure of the power supply circuit 23. The s coils 7 are annularly connected. In FIG. 5, three coils 7 are connected by a delta connection method (triangle connection method). In addition, the c (six in FIG. 5) commutator pieces 9 are short-circuit connected to an annular coil circuit every 360/p degrees (every 180 degrees in FIG. 5) with respect to the rotation angle of the rotor 6. Note that $C_1$ to $C_6$ in FIG. 5 represent six commutator pieces 9. For example, on the annular coil circuit illustrated in FIG. 5, a point $P_1$ between the first coil and the second coil is short-circuit connected to the commutator pieces $C_1$ and $C_4$. Positions of these commutator pieces $C_1$ and $C_4$ are shifted by 180 degrees with respect to the rotation axis C. Therefore, a potential at the point $P_1$ becomes identical every time the rotation axis C makes a half turn. Similarly, a point $P_2$ between the second coil and the third coil is short-circuit connected to the commutator pieces $C_2$ and $C_5$, and a point $P_3$ between the third coil and the first coil is short-circuit connected to the commutator pieces $C_3$ and $C_6$.

In FIG. 5, $B_1$ and $B_2$ represent two brushes 21. Positions of the brushes $B_1$ and $B_2$ are shifted by 90 degrees with respect to the rotation axis C. One brush 21 is connected to a positive pole of a power supply, and the other brush 21 is connected to a negative pole of the power supply. Each of the brushes $B_1$ and $B_2$ is connected to one of the commutator pieces $C_1$ to $C_6$. Among the six commutator pieces 9, the commutator piece 9 connected to the brush 21 varies according to the rotation angle. For example, a combination of the commutator pieces 9 connected to the brushes $B_1$ and $B_2$ varies as ($C_6C_1$, $C_2$), ($C_1$, $C_2$), ($C_1C_2$, $C_3$), ($C_2$, $C_3$) and so on as the rotor 6 rotates. With such a circuit configuration, the rotor 6 is appropriately rotationally driven with high torque.

[B. Functions and Effects]

Figure 6A:
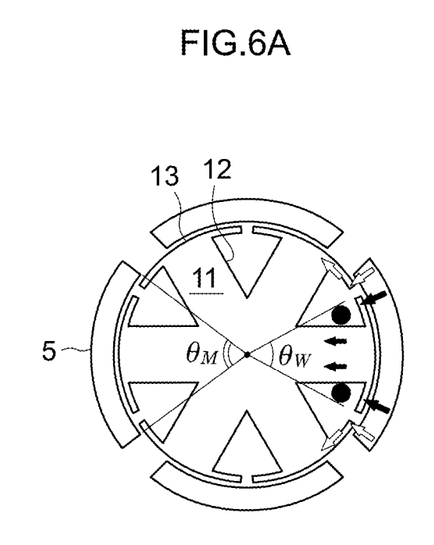
FIG. 6A is a view illustrating a brush motor (with four poles and six slots) as a comparative example.

FIG. 6A is a view illustrating a brush motor (with four poles and six slots) as a comparative example. In this brush motor, the number of coils 7 is 6, which is more than that in the first example, the number of pairs p of magnet magnetic poles 5 is two pairs, which is identical to that in the first example, and a magnet angle $\theta_M$ is slightly smaller than 90 degrees. On the other hand, a blade angle $\theta_W$ is only 60 degrees at the maximum since the number of coils is 6, and the blade angle $\theta_W$ becomes smaller than the magnet angle $\theta_M$. As a result, a magnet magnetic flux is insufficiently picked up, and it is difficult to effectively utilize the magnetic flux.

Figure 6B:
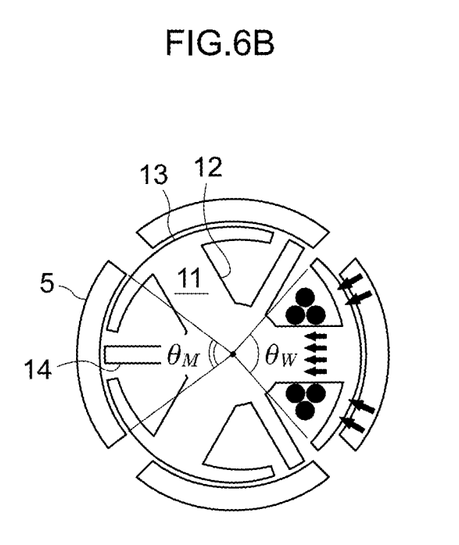
FIG. 6B is a view illustrating the brush motor (with four poles and three slots) of FIG. 1.

On the other hand, in the brush motor 1 (with four poles and three slots) of the first example, the number of coils is three, and thus, the blade angle $\theta_W$ increases as illustrated in FIG. 6B. As a result, the area of the blade 13 facing the magnet magnetic pole 5 is secured, and thus, the magnet magnetic flux is easily picked up by the teeth 11, and the magnetic flux is effectively utilized.

Figure 7A:
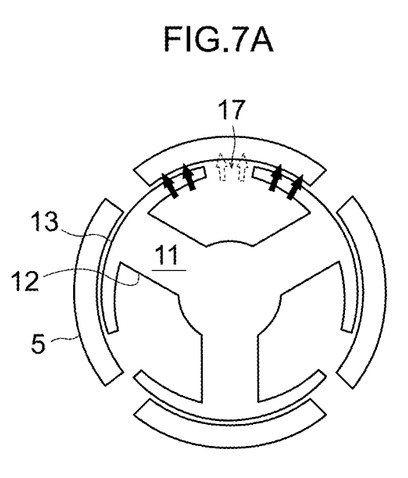
FIG. 7A is a view illustrating a brush motor (having no commutating pole) as a comparative example.

FIG. 7A is a view illustrating a brush motor (having no commutating pole) as a comparative example. When a core 10 does not include a commutating pole 14, a flow of a magnetic flux applied from a magnet magnetic pole 5 to a core 10 becomes intermittent, and vibration (cogging) is likely to increase. For example, a magnetic flux indicated by a white arrow in FIG. 7A is not applied to the core 10 in a state where a relatively wide portion of the slit 17 faces the magnet magnetic pole 5. In addition, there is a possibility that an eddy current is generated in a housing 2 to increase a loss. Further, a permeance coefficient decreases, and there is a possibility that demagnetization easily occur.

On the other hand, the brush motor 1 of the first example includes the commutating pole 14 and the slit 17 that is relatively narrow, and thus, the flow of the magnetic flux becomes continuous. For example, as indicated by a black arrow in FIG. 7B, the magnetic flux is applied to the core 10 even in a state where the commutating pole 14 and the portion of slit 17 face the magnet magnetic pole 5. As a result, vibration (cogging) is likely to decrease. In addition, an eddy current is hardly generated in the housing 2, and a loss is reduced. In addition, a permeance coefficient increases to make demagnetization difficult, and winding rotor balance is also improved.

According to the brush motor 1 of the first example, the following effects can be obtained.

(1) In the brush motor 1 of the first example, the values of p, s, and c are set such that 0.5<p/s<1 and s<c hold. As a result, the size of the brush motor 1 can be easily reduced, or the higher torque can be achieved with the same size (the same volume), for example, as compared with an existing brush motor as illustrated in FIG. 6A. In addition, the magnetic flux can be effectively utilized since the blades 13 of the teeth 11 easily face the magnet magnetic poles 5 with a sufficiently large area. Therefore, the magnet magnetic flux can be sufficiently picked up, and the downsizing and the high torque can be achieved with a simple configuration.

In addition, since a width direction of the slit 17 approaches parallel to a winding direction of the winding as compared with the existing brush motor, the net slit width W can be increased, and the winding can be easily wound. In addition, the number of winding steps decreases, and labor and cost required for manufacturing can be reduced.

(2) In the brush motor 1 of the first example, the blade angle $\theta_W$ is set to be equal to or larger than the magnet angle $\theta_M$ as illustrated in FIG. 6B. As a result, the area of the blade 13 facing the magnet magnetic pole 5 can be secured, and the magnetic flux can be effectively utilized reliably. In addition, the vibration (cogging) can be reduced as compared with the case where the blade angle $\theta_W$ is smaller than the magnet angle $\theta_M$. Further, the slit width W can be increased by increasing the blade angle $\theta_W$, and the winding can be easily wound.

Figure 7B:
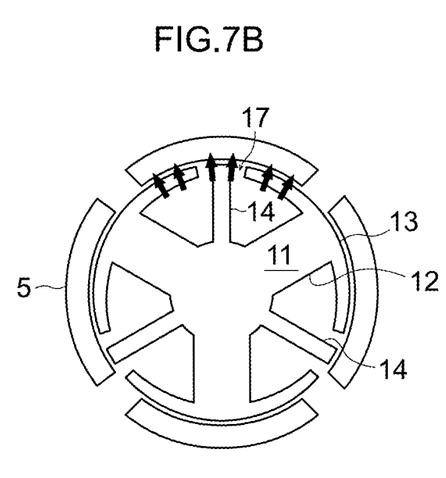
FIG. 7B is a view illustrating the brush motor (having a commutating pole) in FIG. 1.

(3) As illustrated in FIG. 7B, the brush motor 1 of the first example includes the commutating pole 14. Since such a commutating pole 14 is provided, the flow of the magnetic flux exchanged between the magnet magnetic pole 5 and the core 10 can be made continuous, and the vibration (cogging) can be reduced. In addition, the generation of the eddy currents in the housing 2 can be prevented, and the loss can be reduced. In addition, demagnetization can be made difficult by increasing the permeance coefficient, and the winding rotor balance can be improved.

(4) In the brush motor 1 of the first example, the coils 7 are connected in an annular shape as illustrated in FIG. 5. Further, with respect to the annular coil circuit, each of the commutator pieces 9 is short-circuit connected every 180 degrees (every 360/p degrees) with respect to the rotation angle of the rotor 6. With such a circuit configuration, the number of brushes can be reduced to 1/p as compared with the existing brush motor, the size of the brush motor 1 can be easily reduced, and the downsizing and the high torque can be achieved with a simple configuration.

(5) The brush motor 1 of the first example includes the two pairs of magnet magnetic poles 5, the three coils 7, and the six commutator pieces 9, and thus, the combination of (p, s, c) is (2, 3, 6). With such a configuration, the brush motor 1 having the high torque can be achieved with a simple configuration in which the number of coils is small, and the downsizing is easy due to an increase in magnetic flux.

2. Second Example

Figure 8:
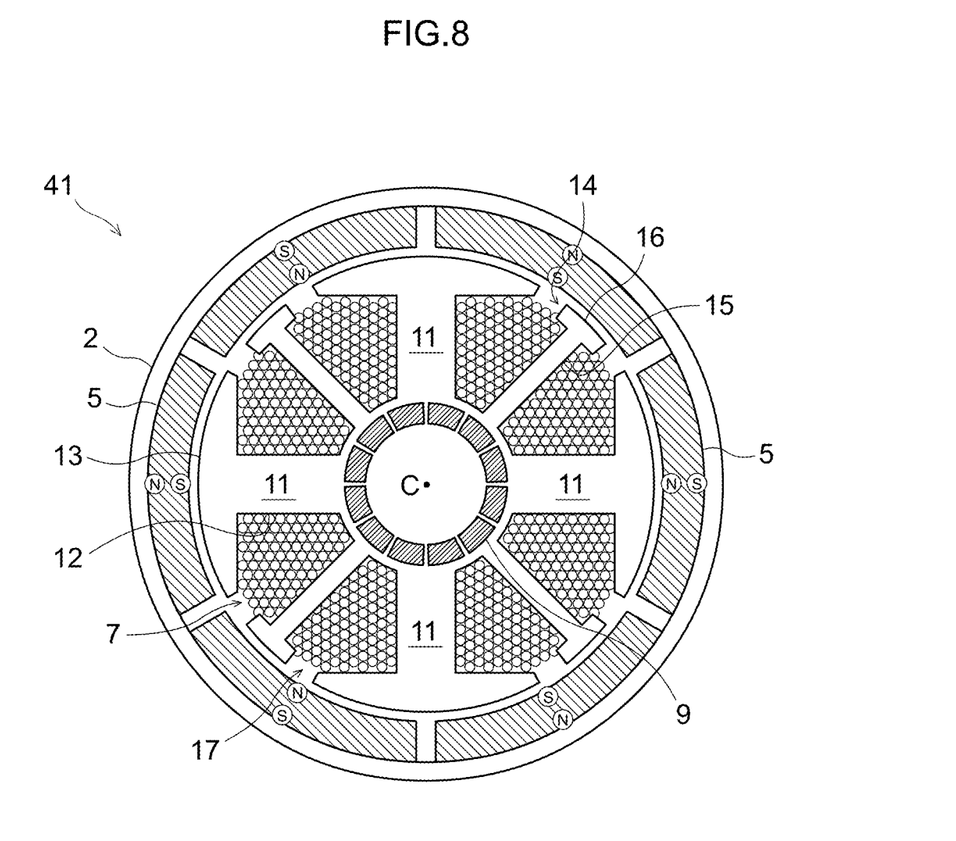
FIG. 8 is a cross-sectional view of a brush motor as a second example.

FIG. 8 is a cross-sectional view illustrating a structure of a brush motor 41 as a second example. Here, a cross-sectional view of a stator 3 and a rotor 6 is displayed to be superimposed on a cross-sectional view of a commutator piece 9 for the sake of convenience. Elements corresponding to the elements described in the first example are denoted by the identical reference signs, and the description thereof is appropriately omitted. The brush motor 41 includes three pairs of magnet magnetic poles 5, four coils 7, and twelve commutator pieces 9. A combination of (p, s, c) is (3, 4, 12), which is a six-pole/four-slit motor.

A commutating pole 14 provided on a core 10 of the brush motor 41 according to the second example includes a commutating pole column 15 and a commutating pole blade 16. As illustrated in FIG. 8, the commutating pole column 15 is a portion extending radially outward of the rotor 6. In addition, the commutating pole blade 16 is a portion having a curved surface shape (an arc surface shape or a shape similar thereto), expanded in the circumferential direction of the rotor 6 from an outer end of the commutating pole column 15, and is arranged so as to face the magnet magnetic pole 5 in a non-contact manner. Note that the commutating pole 14 does not have the coil 7, and an electric wire of the coil 7 is not wound around the commutating pole 14. In addition, the commutating pole blade 16 can be omitted, and the commutating pole 14 having the same shape as that of the first example may be formed.

Figure 9:
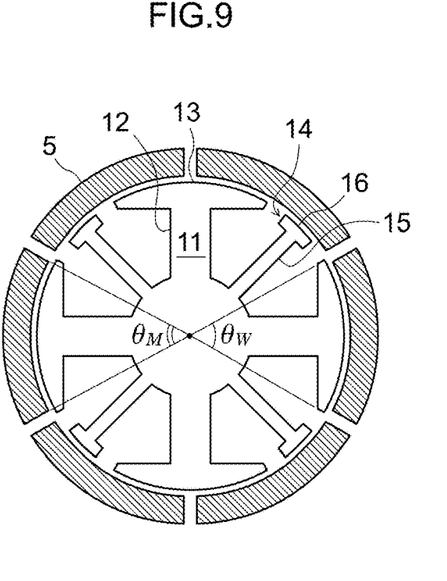
FIG. 9 is a view illustrating a magnet angle and a blade angle of the brush motor of FIG. 8.

FIG. 9 is a view illustrating a magnet angle $\theta_M$ and a blade angle $\theta_W$ of the brush motor 41. In the brush motor 41 of the second example as well, the blade angle $\theta_W$ is preferably set to the magnitude of the magnet angle $\theta_M$ or more ($\theta_W \geq \theta_M$). As a result, the magnet magnetic flux is easily picked up by the teeth 11, and the magnetic flux is effectively utilized.

Figure 10:
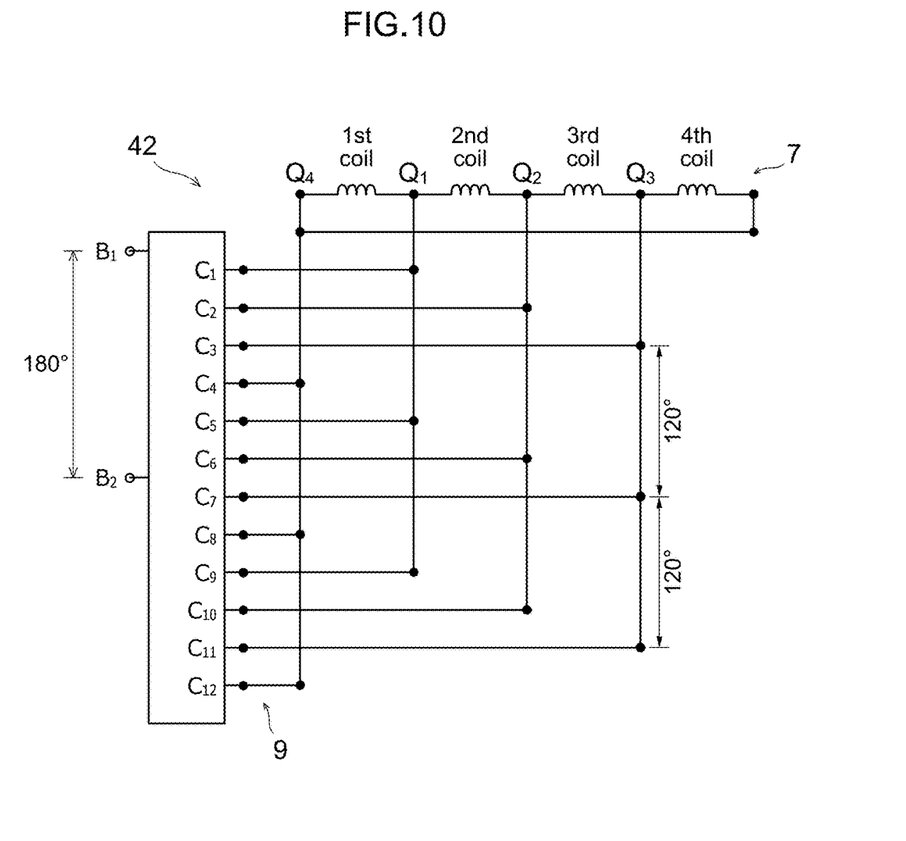
FIG. 10 is a circuit diagram illustrating a structure of a power supply circuit in the brush motor of FIG. 8.

Each of the commutator pieces 9 and each of the coils 7 are connected by a power supply circuit 42. FIG. 10 is a circuit diagram illustrating a structure of the power supply circuit 42. The four coils 7 are annularly connected. In addition, the twelve commutator pieces 9 are short-circuit connected to the annular coil circuit every 360/p degrees (that is, every 120 degrees) with respect to the rotation angle of the rotor 6. For example, on the annular coil circuit illustrated in FIG. 10, a point $Q_1$ between the first coil and the second coil is short-circuit connected to commutator pieces $C_1$, $C_5$, and $C_9$.

Positions of these commutator pieces $C_1$, $C_5$, and $C_9$ are shifted by 120 degrees with respect to a rotation axis C. Therefore, a potential of the point $Q_1$ becomes identical every time the rotation axis C rotates by ⅓. Similarly, a point $Q_2$ between the second coil and the third coil is short-circuit connected to commutators pieces $C_2$, $C_6$, and $C_{10}$. In addition, a point $Q_3$ between the third coil and the fourth coil is short-circuit connected to commutator pieces $C_3$, $C_7$, and $C_{11}$, and a point $Q_4$ between the fourth coil and the first coil is short-circuit connected to commutator pieces $C_4$, $C_5$, and $C_{12}$. In addition, positions of brushes $B_1$ and $B_2$ are shifted by 180 degrees with respect to the rotation axis C.

According to the brush motor 41 of the second example, similar effects as those of the first example can be obtained. For example, downsizing can be performed more easily or higher torque can be achieved with the same size as compared with an existing brush motor. In addition, higher torque can be obtained as compared with the brush motor 1 of the first example. Meanwhile, the number of winding steps decreases with a concentrated-winding structure, and labor and cost required for manufacturing can be reduced as compared with an existing brush motor (for example, a brush motor with six poles and twelve slots) in which the number of magnet magnetic poles 5 is identical to that of the brush motor 41 of the second example and the number of coils is larger. Further, a coil end can be reduced with the concentrated-winding structure, and winding resistance can be reduced. In addition, the pulsation of a current can be increased as compared with the first example, and the use of the pulsation of the current enables sensorless control that does not require an additionally required sensor magnet.

3. Third Example

Figure 11:
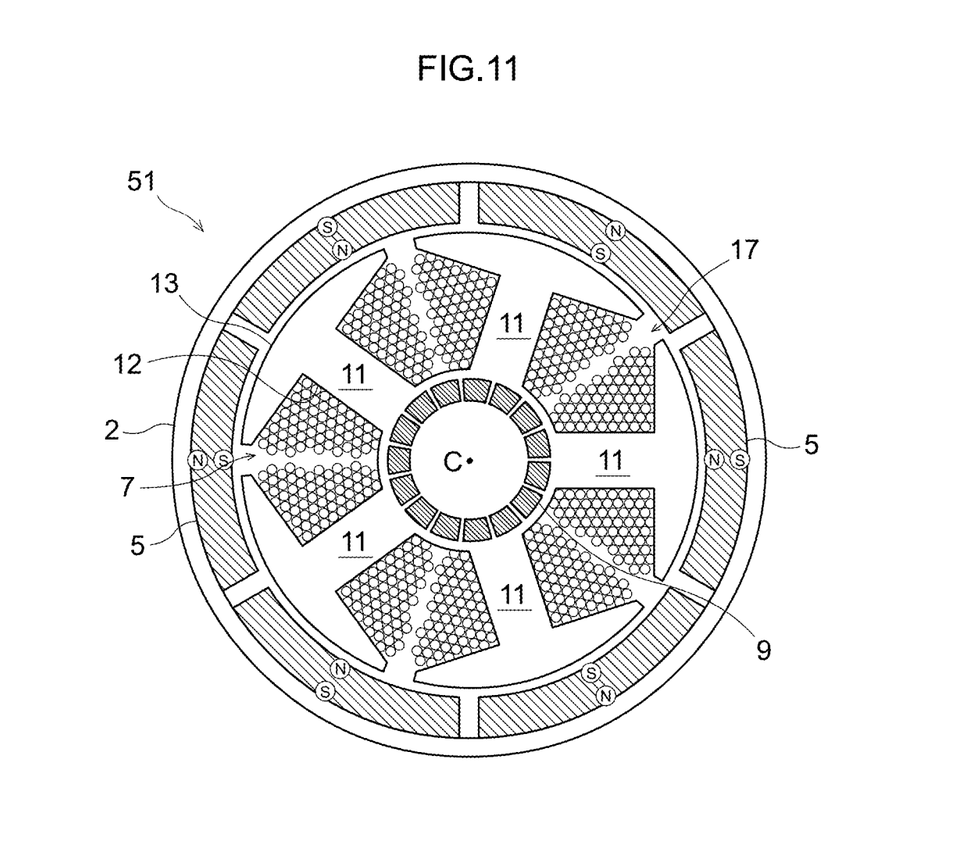
FIG. 11 is a cross-sectional view of a brush motor as a third example.

FIG. 11 is a cross-sectional view illustrating a structure of a brush motor 51 as a third example. Here, a cross-sectional view of a stator 3 and a rotor 6 is displayed to be superimposed on a cross-sectional view of a commutator piece 9 for the sake of convenience. Elements corresponding to the elements described in the first example are denoted by the identical reference signs, and the description thereof is appropriately omitted. The brush motor 51 includes three pairs of magnet magnetic poles 5, five coils 7, and fifteen commutator pieces 9. A combination of (p, s, c) is (3, 5, 15), which is a six-pole/five-slit motor. Note that a commutating pole 14 is omitted in a core 10 of the brush motor 51 according to the third example. As a result, a slit width W between adjacent blades 13 is secured, and an electric wire of the coil 7 is easily wound.

Figure 12:
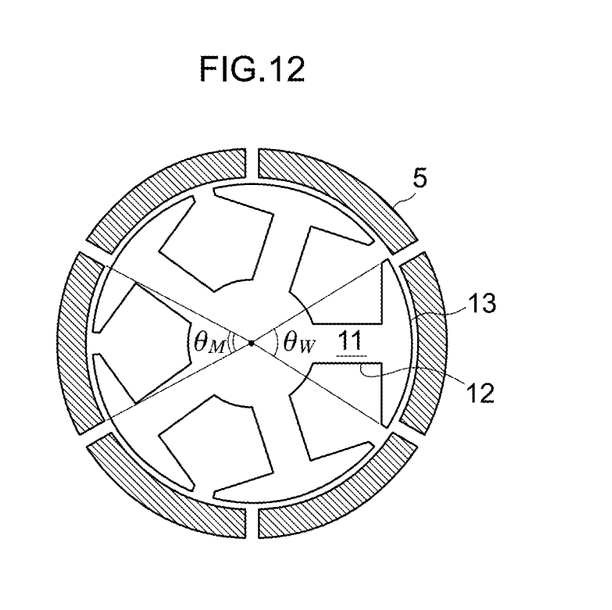
FIG. 12 is a view illustrating a magnet angle and a blade angle of the brush motor of FIG. 11.

FIG. 12 is a view illustrating a magnet angle $\theta_M$ and a blade angle $\theta_W$ of the brush motor 51. In the brush motor 51 of the third example as well, the blade angle $\theta_W$ is preferably set to the magnitude of the magnet angle $\theta_M$ or more ($\theta_W \geq \theta_M$). As a result, the magnet magnetic flux is easily picked up by the teeth 11, and the magnetic flux is effectively utilized.

Figure 13:
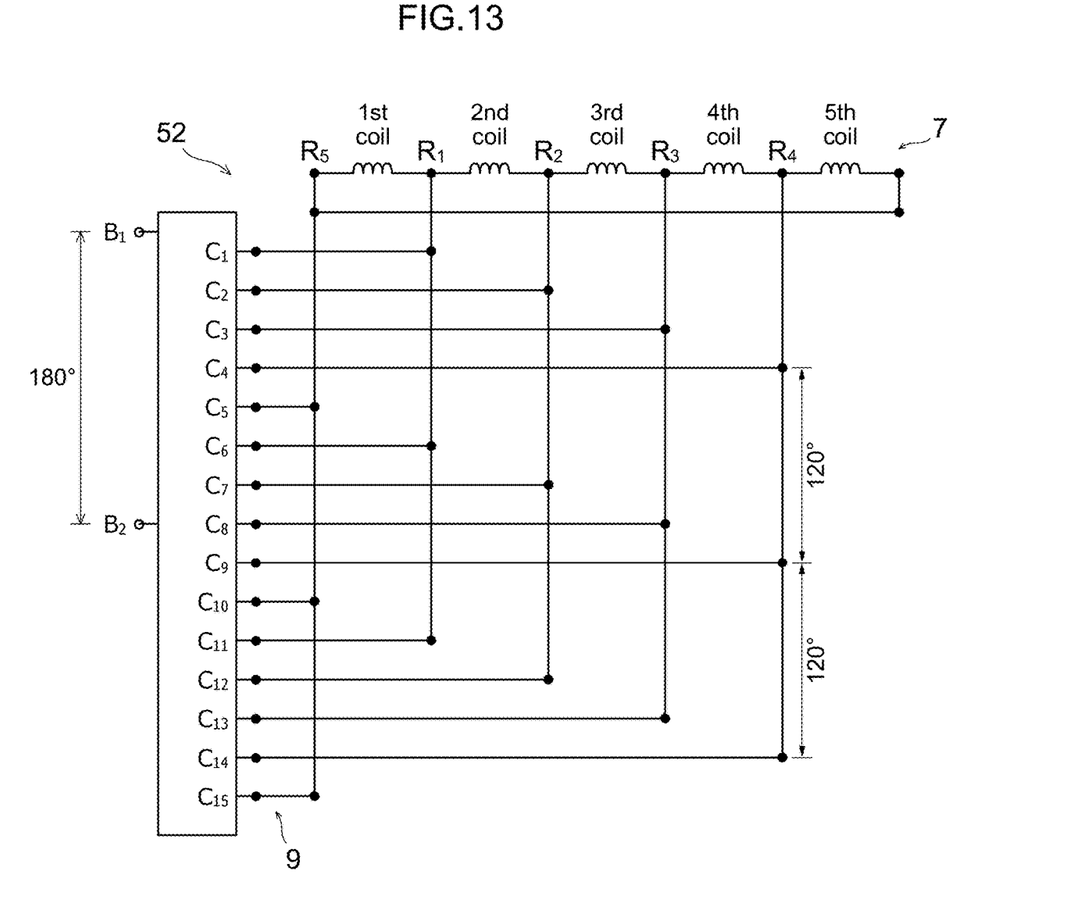
FIG. 13 is a circuit diagram illustrating a structure of a power supply circuit in the brush motor of FIG. 11.

Each of the commutator pieces 9 and each of the coils 7 are connected by a power supply circuit 52. FIG. 13 is a circuit diagram illustrating a structure of the power supply circuit 52. The five coils 7 are annularly connected. In addition, the fifteen commutator pieces 9 are short-circuit connected to the annular coil circuit every 360/p degrees (that is, every 120 degrees) with respect to the rotation angle of the rotor 6. For example, on the annular coil circuit illustrated in FIG. 13, a point $R_1$ between the first coil and the second coil is short-circuit connected to commutator pieces $C_1$, $C_6$, and $C_{11}$.

Positions of these commutator pieces $C_1$, $C_6$, and $C_{11}$ are shifted by 120 degrees with respect to a rotation axis C. Therefore, a potential of the point $R_1$ becomes identical every time the rotation axis C rotates by ⅓. Similarly, a point $R_2$ between the second coil and the third coil is short-circuit connected to commutator pieces $C_2$, $C_7$, and $C_{12}$. Further, a point $R_3$ between the third coil and the fourth coil is short-circuit connected to commutator pieces $C_3$, $C_8$, and $C_{13}$, a point $R_4$ between the fourth coil and the fifth coil is short-circuit connected to commutator pieces $C_4$, $C_9$, and $C_{14}$, and a point $R_5$ between the fifth coil and the first coil is short-circuit connected to commutator pieces $C_5$, $C_{10}$, and $C_{15}$. In addition, positions of brushes $B_1$ and $B_2$ are shifted by 180 degrees with respect to the rotation axis C.

According to the brush motor 51 of the third example, similar effects as those of the first example and the second example can be obtained. For example, downsizing can be performed more easily or higher torque can be achieved with the same size as compared with an existing brush motor. In addition, higher torque can be obtained as compared with the brush motors 1 and 41 of the first example and the second example. Further, as compared with the first example and the second example, the pulsation of the torque can be reduced, vibration can be reduced to enhance the controllability.

4. Others

The above examples are merely examples, and there is no intention to exclude applications of various modifications and technologies that are not explicitly described in the present examples. The configurations of the present examples can be variously modified and implemented within a scope not departing from the gist thereof. In addition, the configurations of the present examples can be selected as necessary, or can be appropriately combined with various configurations included in known technologies.

[Description of Reference Signs]

| | |
|---|---|
| 1, 41, 51 | brush motor |
| 2 | housing |
| 3 | stator (stator) |
| 4 | magnet |
| 5 | magnet magnetic pole |
| 6 | rotor (rotor) |
| 7 | coil |
| 8 | commutator |
| 9 | commutator piece |
| 10 | core (rotor core) |

-continued

[Description of Reference Signs]

| | |
|---|---|
| 11 | tooth |
| 12 | column |
| 13 | blade |
| 14 | commutating pole |
| 15 | commutating pole column |
| 16 | commutating pole blade |
| 17 | slit |
| 20 | shaft |
| 21 | brush |
| 22 | brush arm |
| 23, 42, 52 | power supply circuit |
| $\theta_W$ | blade angle |
| $\theta_M$ | magnet angle |
| C | rotation axis |
| W | slit width |

What is claimed is:

1. A brush motor comprising:
   a rotor core provided in a rotor;
   s teeth provided in the rotor core;
   s concentrated-winding coils with electric wires being respectively wound around the teeth, the number of the concentrated-winding coils being equal to the number of the teeth;
   a commutator provided on the rotor in a relatively non-rotatable manner;
   c commutator pieces provided in the commutator and connected to the s concentrated-winding coils;
   p pairs of magnet magnetic poles provided on a stator and arranged to face the teeth; and
   a brush that is brought into sliding contact with the commutator pieces to supply a current to the s concentrated-winding coils,
   wherein following Inequality A and Inequality B hold:

$$0.5 < p/s < 1, \quad \text{(Inequality A); and}$$

$$s < c, \quad \text{(Inequality B),}$$

the tooth includes a blade formed in a curved surface shape expanding in a rotation direction of the rotor along a surface of the magnet magnetic pole,
   the magnet magnetic pole is formed in a curved surface shape facing the blade,
   a central angle of a fan shape, surrounded by the blade and line segments connecting both ends of the blade to the rotation axis in a cross section perpendicular to the rotation axis of the rotor, is defined as a blade angle, an angle formed between a magnetized region of one of the magnet magnetic poles and the rotation axis is defined as a magnet angle, and the blade angle is equal to or larger than the magnet angle, and
   the magnet magnetic poles are arranged such that orientations of the magnetic fields are reversed between the adjacent magnet magnetic poles in the circumferential direction.

2. The brush motor according to claim 1, further comprising
   at least one commutating pole that is provided integrally with the rotor core between the adjacent s concentrated-winding coils, extends radially from a rotation center of the rotor to reinforce a flow of a magnetic flux, and does not have a coil, and
   the commutating pole is arranged between the adjacent teeth so as to partition between the concentrated-winding coils.

3. The brush motor according to claim 1, further comprising
 a power supply circuit in which the s concentrated-winding coils are annularly connected, and the c commutator pieces are short-circuit connected every $360/p$ degrees with respect to a rotation angle of the rotor.

4. The brush motor according to claim 1, wherein the p is two, the s is three, and the c is six.

5. The brush motor according to claim 1, wherein the p is three, the s is four, and the c is twelve.

6. The brush motor according to claim 1, wherein the p is three, the s is five, and the c is fifteen.

* * * * *